US012103306B2

(12) United States Patent
Nishimura

(10) Patent No.: US 12,103,306 B2
(45) Date of Patent: *Oct. 1, 2024

(54) FLOW-THROUGH PRINTHEAD WITH BYPASS MANIFOLD

(71) Applicant: Hiroshi Nishimura, West Hills, CA (US)

(72) Inventor: Hiroshi Nishimura, West Hills, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,556

(22) Filed: Jun. 23, 2023

(65) Prior Publication Data

US 2023/0347649 A1 Nov. 2, 2023

Related U.S. Application Data

(63) Continuation of application No. 17/316,098, filed on May 10, 2021, now Pat. No. 11,724,497, which is a continuation of application No. 16/351,115, filed on Mar. 12, 2019, now Pat. No. 11,034,149.

(51) Int. Cl.
*B41J 2/14* (2006.01)

(52) U.S. Cl.
CPC ......... *B41J 2/1433* (2013.01); *B41J 2/14201* (2013.01); *B41J 2002/14306* (2013.01); *B41J 2002/14338* (2013.01); *B41J 2002/14419* (2013.01); *B41J 2202/12* (2013.01)

(58) Field of Classification Search
CPC ............... B41J 2/14201; B41J 2/14233; B41J 2/14274; B41J 2/1433; B41J 2002/14362; B41J 2202/12; B41J 2002/14419; B41J 2202/20; B41J 2002/14338; B41J 2002/14306
See application file for complete search history.

(56) References Cited

U.S. PATENT DOCUMENTS 11,034,149 B2 * 6/2021 Nishimura ........... B41J 2/14233
11,724,497 B2 * 8/2023 Nishimura ........... B41J 2/14201 347/47
2011/0080456 A1 * 4/2011 Shibata ................ B41J 2/14233 347/92

* cited by examiner

*Primary Examiner* — Anh T Vo
(74) *Attorney, Agent, or Firm* — Duft & Bornsen, PC

(57) ABSTRACT

Printheads for a jetting apparatus. In one embodiment, a printhead comprises a plurality of flow-through jetting channels each configured to jet a print fluid out of a nozzle. The printhead further includes a supply manifold fluidly coupled to the flow-through jetting channels, a return manifold fluidly coupled to the flow-through jetting channels, and one or more bypass manifolds fluidly coupled between the supply manifold and the return manifold.

20 Claims, 8 Drawing Sheets

FLOW-THROUGH PRINTHEAD WITH BYPASS MANIFOLD

RELATED APPLICATIONS

This non-provisional patent application is a continuation of co-pending U.S. patent application Ser. No. 17/316,098 filed on May 10, 2021, which is a continuation of U.S. Pat. No. 11,034,149, issued on Jun. 15, 2021, both of which are hereby incorporated by reference.

TECHNICAL FIELD

The following disclosure relates to the field of image formation, and in particular, to printheads and the use of printheads.

BACKGROUND

Image formation is a procedure whereby a digital image is recreated on a medium by propelling droplets of ink or another type of print fluid onto a medium, such as paper, plastic, a substrate for 3D printing, etc. Image formation is commonly employed in apparatuses, such as printers (e.g., inkjet printer), facsimile machines, copying machines, plotting machines, multifunction peripherals, etc. The core of a typical jetting apparatus or image forming apparatus is one or more liquid-droplet ejection heads (referred to generally herein as "printheads") having nozzles that discharge liquid droplets, a mechanism for moving the printhead and/or the medium in relation to one another, and a controller that controls how liquid is discharged from the individual nozzles of the printhead onto the medium in the form of pixels.

A typical printhead includes a plurality of nozzles aligned in one or more rows along a discharge surface of the printhead. Each nozzle is part of a "jetting channel", which includes the nozzle, a pressure chamber, and a diaphragm that is driven by an actuator, such as a piezoelectric actuator. A printhead also includes a drive circuit that controls when each individual jetting channel fires based on image data. To jet from a jetting channel, the drive circuit provides a jetting pulse to the actuator, which causes the actuator to deform a wall of the pressure chamber via the diaphragm. The deformation of the pressure chamber creates pressure waves within the pressure chamber that eject a droplet of print fluid (e.g., ink) out of the nozzle.

SUMMARY

Embodiments described herein comprise a flow-through type of printhead, where a print fluid is able to flow from a supply manifold through jetting channels to a return manifold, or vice-versa. The print fluid, which is not ejected from nozzles of the jetting channels, circulates through the jetting channels and into the return manifold. A printhead as described herein has one or more bypass manifolds that fluidly couple the supply manifold and the return manifold. The bypass manifold(s) helps reduce the pressure delta required for the printhead, and helps reduce a pressure difference between nozzles closer to an inlet port on the printhead and nozzles closer to an outlet port.

One embodiment comprises a printhead that includes a plurality of flow-through jetting channels each configured to jet a print fluid out of a nozzle, a supply manifold fluidly coupled to the flow-through jetting channels, a return manifold fluidly coupled to the flow-through jetting channels, and one or more bypass manifolds fluidly coupled between the supply manifold and the return manifold.

In another embodiment, the printhead further includes a first I/O port fluidly coupled to the supply manifold, and a second I/O port fluidly coupled to the return manifold.

In another embodiment, a fluid resistance of the bypass manifold(s) is greater than a fluid resistance of the flow-through jetting channels.

Another embodiment comprises a jetting apparatus that includes a printhead as described above, and a controller configured to control the printhead to jet the print fluid.

Another embodiment comprises a printhead that includes a housing having I/O ports disposed at a top surface, and a plate stack attached to an interface surface of the housing that form a plurality of flow-through jetting channels. The housing and the plate stack form a supply manifold that is fluidly coupled to a first one of the I/O ports and to the flow-through jetting channels, a return manifold that is fluidly coupled to a second one of the I/O ports and to the flow-through jetting channels, and one or more bypass manifolds disposed between the supply manifold and the return manifold to fluidly couple the supply manifold and the return manifold.

In another embodiment, the plate stack comprises a diaphragm plate that forms diaphragms for the flow-through jetting channels, an upper restrictor plate, an upper chamber plate and a lower chamber plate that form pressure chambers for the flow-through jetting channels, a lower restrictor plate, and a nozzle plate having nozzles for the flow-through jetting channels. The upper restrictor plate fluidly couples the pressure chambers to the supply manifold, and the lower restrictor plate fluidly couples the pressure chambers to the return manifold.

In another embodiment, the housing includes a supply manifold duct along the interface surface that forms the supply manifold, and one or more return manifold ducts along the interface surface that form the return manifold. The diaphragm plate includes one or more bypass manifold openings configured to fluidly couple the supply manifold duct and the return manifold ducts of the housing.

In another embodiment, the return manifold ducts are disposed transversely on the interface surface toward short ends of the housing, and the bypass manifold opening(s) is disposed toward short ends of the diaphragm plate, and extends longitudinally inward to coincide with the return manifold ducts and the supply manifold duct of the housing.

In another embodiment, the supply manifold duct comprises a loop around an access hole in the housing, and the bypass manifold opening(s) coincides with a section of the supply manifold duct that is disposed transversely.

In another embodiment, a fluid resistance of the bypass manifold(s) is greater than a fluid resistance of the flow-through jetting channels.

Another embodiment comprises a jetting apparatus that includes one or more printheads configured to jet droplets onto a medium, and a controller configured to control the printhead(s). The printhead(s) includes a plurality of flow-through jetting channels, a supply manifold configured to supply a print fluid to the flow-through jetting channels, a return manifold configured to receive the print fluid from the flow-through jetting channels, and one or more bypass manifolds fluidly coupled between the supply manifold and the return manifold.

In another embodiment, a fluid resistance of the bypass manifold(s) is greater than a fluid resistance of the flow-through jetting channels.

In another embodiment, the printhead(s) comprises a housing having I/O ports disposed at a top surface, and a plate stack attached to an interface surface of the housing that form the flow-through jetting channels. The housing and the plate stack form the supply manifold that is fluidly coupled to a first one of the I/O ports, and the return manifold that is fluidly coupled to a second one of the I/O ports.

In another embodiment, the plate stack comprises a diaphragm plate that forms diaphragms for the flow-through jetting channels, an upper restrictor plate, an upper chamber plate and a lower chamber plate that form pressure chambers for the flow-through jetting channels, a lower restrictor plate, and a nozzle plate having nozzles for the flow-through jetting channels. The upper restrictor plate fluidly couples the pressure chambers to the supply manifold, and the lower restrictor plate fluidly couples the pressure chambers to the return manifold.

In another embodiment, the housing includes a supply manifold duct along the interface surface that forms the supply manifold, and one or more return manifold ducts along the interface surface that form the return manifold. The diaphragm plate includes one or more bypass manifold openings configured to fluidly couple the supply manifold duct and the return manifold ducts of the housing.

In another embodiment, the return manifold ducts are disposed transversely on the interface surface toward short ends of the housing, and the bypass manifold opening(s) is disposed toward short ends of the diaphragm plate, and extends longitudinally inward to coincide with the return manifold ducts and the supply manifold duct of the housing.

In another embodiment, the supply manifold duct comprises a loop around an access hole in the housing, and the bypass manifold opening(s) coincides with a section of the supply manifold duct that is disposed transversely.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
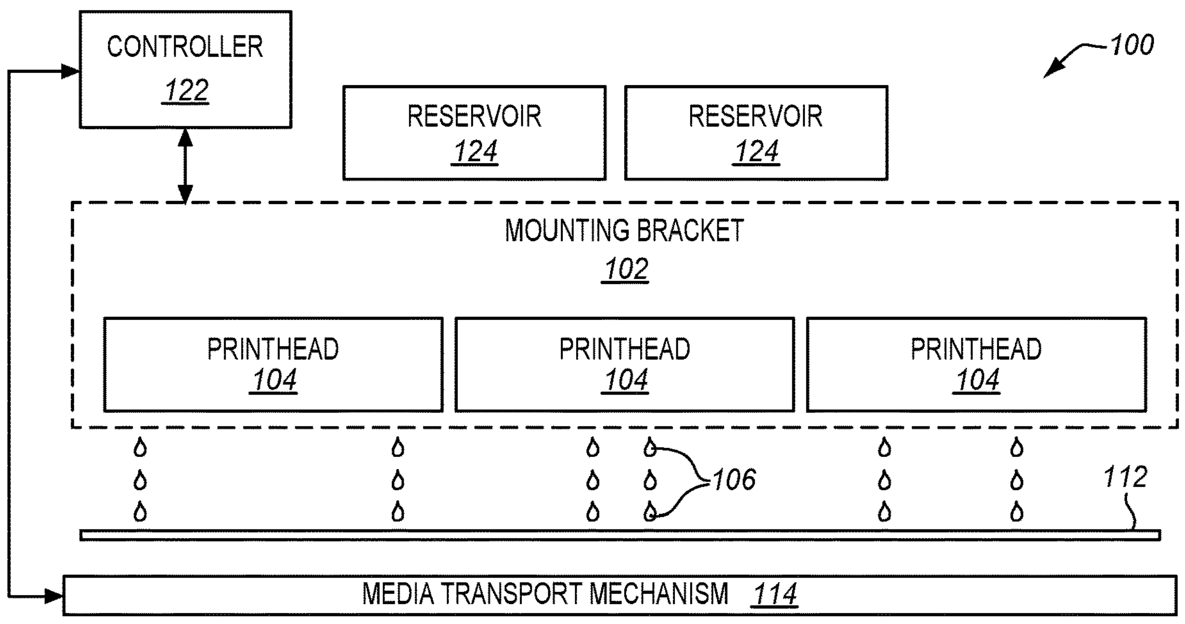
FIG. 1 is a schematic diagram of a jetting apparatus in an illustrative embodiment.

FIG. 1 is a schematic diagram of a jetting apparatus 100 in an illustrative embodiment. One example of jetting apparatus 100 is an inkjet printer that performs single-pass or multi-pass printing. Jetting apparatus 100 includes a mounting bracket 102 that supports one or more printheads 104 above a medium 112. Mounting bracket 102 may be disposed on a carriage assembly that reciprocates back and forth along a scan line or scan directions for multi-pass printing. Alternatively, mounting bracket 102 may be fixed within jetting apparatus 100 for single-pass printing. Printheads 104 are a device, apparatus, or component configured to eject droplets 106 of a print fluid, such as ink (e.g., water, solvent, oil, or UV-curable), through a plurality of orifices or nozzles (not visible in FIG. 1). The droplets 106 ejected from the nozzles of printheads 104 are directed toward medium 112. Medium 112 comprises any type of material upon which ink or another print fluid is applied by a printhead, such as paper, plastic, card stock, transparent sheets, a substrate for 3D printing, cloth, etc. Typically, nozzles of printheads 104 are arranged in one or more rows so that ejection of print fluid from the nozzles causes formation of characters, symbols, images, layers of an object, etc., on medium 112 as printhead 104 and/or medium 112 are moved relative to one another. Media transport mechanism 114 is configured to move medium 112 relative to printheads 104. Jetting apparatus 100 also includes a jetting apparatus controller 122 that controls the overall operation of jetting apparatus 100. Jetting apparatus controller 122 may connect to a data source to receive image data, and control each printhead 104 to discharge the print fluid on a desired pixel grid on medium 112. Jetting apparatus 100 also includes one or more reservoirs 124 for a print fluid. Although not shown in FIG. 1, reservoirs 124 may be connected to printheads 104 via hoses or the like.

Figure 2:
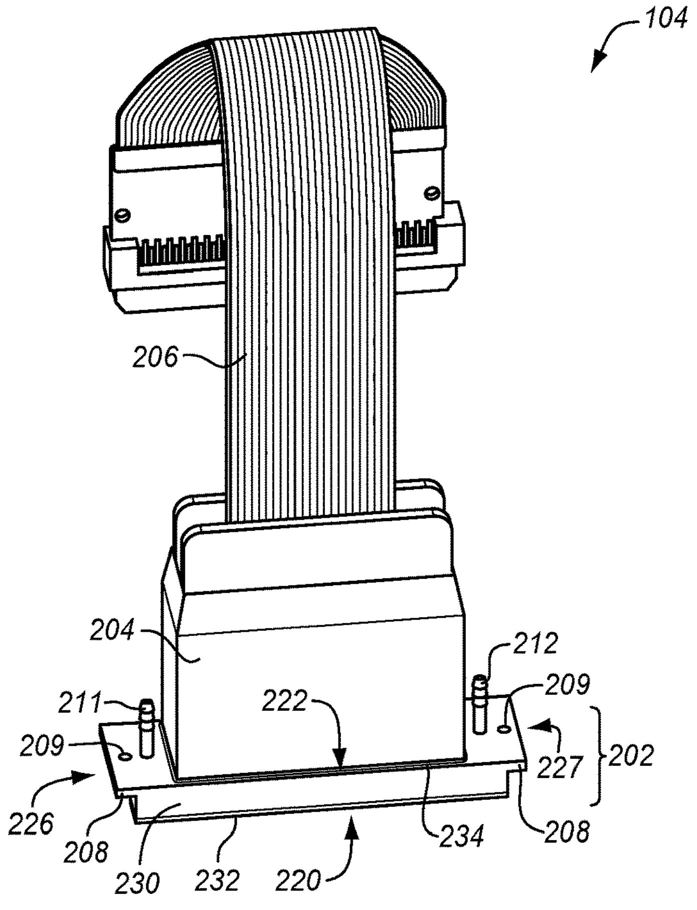
FIG. 2 is a perspective view of a printhead in an illustrative embodiment.

FIG. 2 is a perspective view of a printhead 104 in an illustrative embodiment. Printhead 104 includes a head member 202 and electronics 204. Head member 202 is an elongated component that forms the jetting channels of printhead 104. A typical jetting channel includes a nozzle, a pressure chamber, and a diaphragm that is driven by an actuator, such as a piezoelectric actuator. Electronics 204 control how the nozzles of printhead 104 jet droplets in response to control signals. Although not visible in FIG. 2, electronics 204 may include a plurality of actuators (e.g., piezoelectric actuators) that contact the diaphragms of the jetting channels. Electronics 204 also include cabling 206, such as a ribbon cable, that connects to a controller (e.g., jetting apparatus controller 122) to receive the control signals. Printhead 104 also includes attachment members 208, which are configured to secure printhead 104 to a jetting apparatus, such as to mounting bracket 102 as illustrated in FIG. 1. Attachment members 208 may include one or more holes 209 so that printhead 104 may be mounted within a jetting apparatus by screws, bolts, pins, etc.

The bottom surface 220 of head member 202 includes the nozzles of the jetting channels, and represents the discharge surface of printhead 104. The top surface 222 of head member 202 represents the Input/Output (I/O) portion for receiving print fluids into printhead 104 and/or conveying print fluids (e.g., fluids that are not jetted) out of printhead 104. Top surface 222, which is also referred to as the I/O surface, includes a plurality of I/O ports 211-212. Top surface 222 has two ends 226-227 that are separated by electronics 204. I/O port 211 is disposed toward end 226, and I/O port 212 is disposed toward end 227. I/O ports 211-212 may include a hose coupling, hose barb, etc., for coupling with a supply hose of a reservoir 124, a cartridge, or the like.

Head member 202 includes a housing 230 and a plate stack 232. Housing 230 is a rigid member made from stainless steel or another type of material. Housing 230 includes an access hole 234 that provides a passageway for electronics 204 to pass through housing 230 so that actuators may interface with diaphragms of the jetting channels. Plate stack 232 attaches to an interface surface (not visible) of housing 230. Plate stack 232 (also referred to as a laminate plate stack) is a series of plates that are fixed or bonded to one another to form a laminated stack. Plate stack 232 may include the following plates: one or more nozzle plates, one or more chamber plates, one or more restrictor plates, and a diaphragm plate. A nozzle plate includes a plurality of nozzles that are arranged in one or more rows (e.g., two rows, four rows, etc.). A chamber plate includes a plurality of openings that form the pressure chambers of the jetting channels. A restrictor plate includes a plurality of restrictors that fluidly connect the pressure chambers of the jetting channels with a manifold. A diaphragm plate is a sheet of a semi-flexible material that vibrates in response to actuation by an actuator (e.g., piezoelectric actuator).

Figure 3:
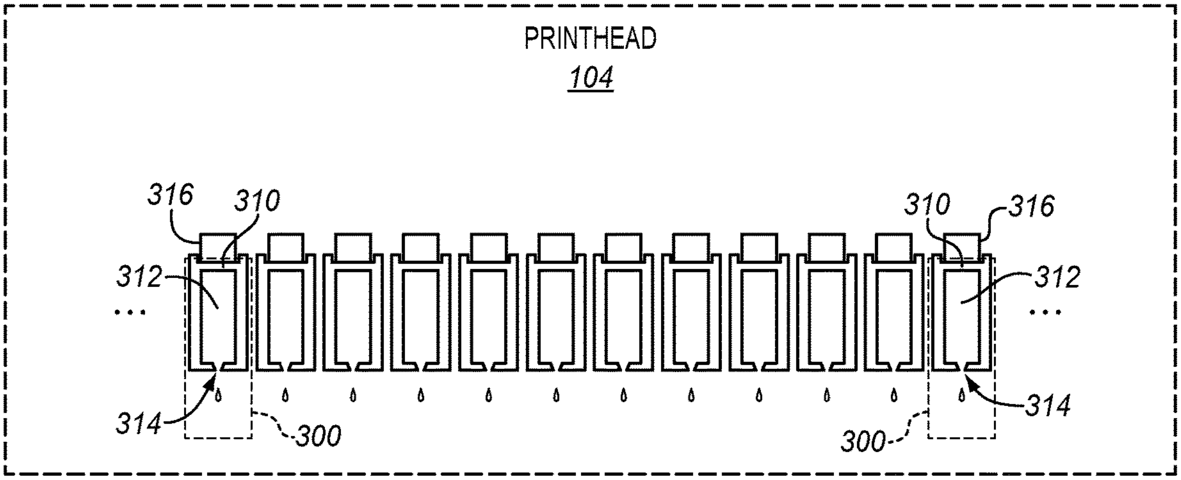
FIG. 3 is a schematic diagram of jetting channels within a printhead in an illustrative embodiment.

FIG. 3 is a schematic diagram of jetting channels 300 within printhead 104 in an illustrative embodiment. This diagram represents a view along a length of printhead 104. A jetting channel 300 is a structural element within printhead 104 that jets or ejects a print fluid. Each jetting channel 300 includes a diaphragm 310, a pressure chamber 312, and a nozzle 314. An actuator 316 contacts diaphragm 310 to control jetting from a jetting channel 300. Jetting channels 300 may be formed in one or more rows along a length of printhead 104, and each jetting channel 300 may have a similar configuration as shown in FIG. 3.

Figure 4:
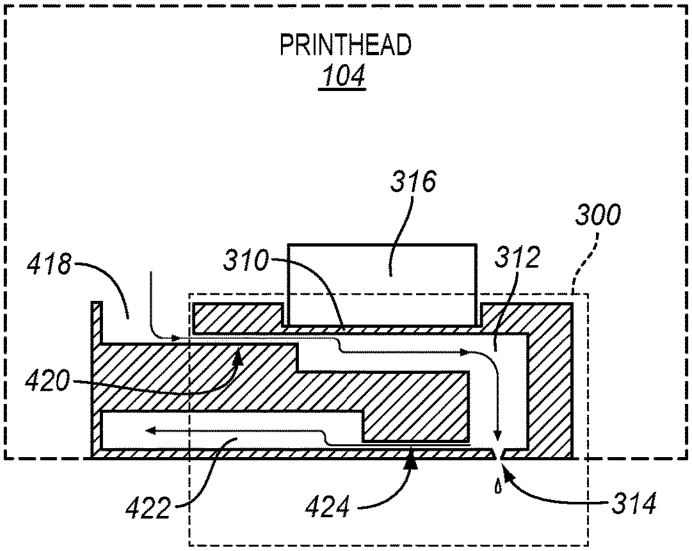
FIGS. 4-5 are schematic diagrams of a jetting channel within a printhead in an illustrative embodiment.
Figure 5:
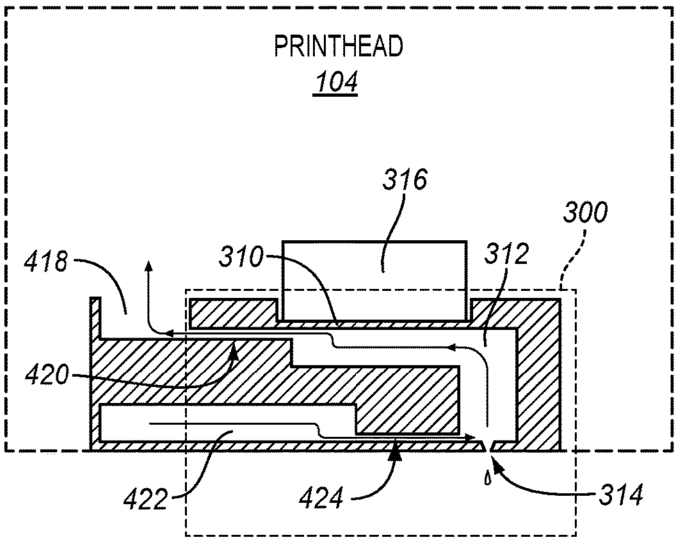

FIGS. 4-5 are schematic diagrams of a jetting channel 300 within printhead 104 in an illustrative embodiment. The view in FIGS. 4-5 is of a cross-section of a jetting channel 300 across a width of a portion of printhead 104. A supply manifold 418 is configured to supply a print fluid to jetting channel 300 through a first restrictor 420. Restrictor 420 fluidly couples pressure chamber 312 with supply manifold 418, and controls the flow of the print fluid into pressure chamber 312. A return manifold 422 is configured convey a print fluid out of a jetting channel 300 through a second restrictor 424. Restrictor 424 fluidly couples pressure chamber 312 to return manifold 422, and controls the flow of the print fluid out of pressure chamber 312. Printhead 104 is a "flow-through" printhead or re-circulating printhead, which means that the print fluid may be re-circulated through printhead 104 past each nozzle 314. By having a flow-through design, a print fluid is able to flow from supply manifold 418 to a return manifold 422 through jetting channels 300 in printhead 104.

The arrow in FIG. 4 illustrates a flow path of a print fluid through jetting channel 300 in one direction. Although not shown in FIG. 4, supply manifold 418 is coupled to a reservoir or the like, and return manifold 422 is coupled to the same or another reservoir. The print fluid flows from supply manifold 418 in printhead 104 and into pressure chamber 312 through a first restrictor 420. One wall of pressure chamber 312 is formed with diaphragm 310 that physically interfaces with actuator 316, and vibrates in response to actuation by actuator 316. The print fluid flows through pressure chamber 312 and out of nozzle 314 in the form of a droplet in response to actuation by actuator 316. Actuator 316 is configured to receive a drive waveform, and to actuate or "fire" in response to a jetting pulse on the drive waveform. Firing of actuator 316 in jetting channel 300 creates pressure waves in pressure chamber 312 that cause jetting of a droplet from nozzle 314. The print fluid, which is not jetted from nozzle 314, flows from pressure chamber 312 into return manifold 422 through a second restrictor 424. The print fluid may flow through jetting channel 300 due to a pressure difference between a reservoir coupled to supply manifold 418 and a reservoir coupled to return manifold 422.

The arrow in FIG. 5 illustrates a flow path of a print fluid within jetting channel 300 in a reverse direction. The print fluid flows from return manifold 422 and into pressure chamber 312 through the second restrictor 424. The print fluid flows through pressure chamber 312 and out of nozzle 314 in the form of a droplet in response to actuation by actuator 316. The print fluid, which is not jetted from nozzle 314, flows from pressure chamber 312 into supply manifold 418 through the first restrictor 420. The length of the first restrictor 420 may be the same as the length of the second restrictor 424 to allow for a reversal of flow in this manner.

Jetting channel 300 as shown in FIGS. 3-5 is an example to illustrate a basic structure of a jetting channel, such as the diaphragm, pressure chamber, and nozzle. Other types of jetting channels are also considered herein. For example, some jetting channels may have a pressure chamber having a different shape than is illustrated in FIGS. 3-5. Also, the position of supply manifold 418, return manifold 422, and/or restrictors 420/424 may differ in other embodiments.

Figure 6:
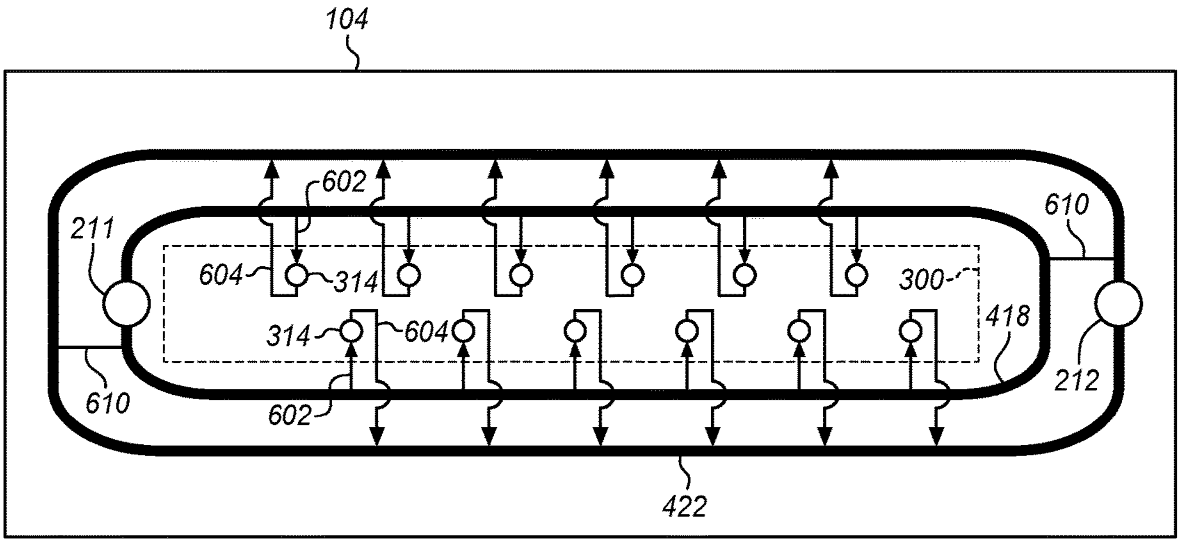
FIG. 6 is a schematic diagram of a printhead in an illustrative embodiment.

FIG. 6 is a schematic diagram of printhead 104 in an illustrative embodiment. The jetting channels 300 of printhead 104 are schematically illustrated in FIG. 6 as nozzles in two nozzle rows. Although the nozzles are shown as staggered in FIG. 6, the nozzles in the two nozzle rows may be aligned in other embodiments. Also, there may be more or less than two nozzle rows in other embodiments. Head member 202 of printhead 104 includes supply manifold 418, which is a groove, duct, conduit, etc., within head member 202 that is configured to convey or supply a print fluid to/from jetting channels 300. Supply manifold 418 is fluidly coupled to I/O port 211, and is also fluidly coupled to the jetting channels 300 indicated by nozzles 314 via fluid path 602. Fluid path 602 is provided in the form of a restrictor (e.g., restrictor 420), which is a passageway that fluidly couples a manifold to a pressure chamber and prevents a backflow of print fluid. When a print fluid is supplied to I/O port 211, the print fluid flows through supply manifold 418 and is drawn into the jetting channels 300. The major portions or sections of supply manifold 418 are disposed longitudinally within printhead 104 to fluidly couple with a row of jetting channels 300.

Head member 202 of printhead 104 also includes return manifold 422, which is a groove, duct, conduit, etc., within head member 202 that is configured to convey or receive a print fluid to/from jetting channels 300. Return manifold 422 is fluidly coupled to I/O port 212, and is also fluidly coupled to the jetting channels 300 indicated by nozzles 314 via fluid path 604. Fluid path 604 is provided in the form of a restrictor (e.g., restrictor 424). A print fluid may flow out of jetting channels 300, through return manifold 422, and out I/O port 212. The major portions or sections of return manifold 422 are disposed longitudinally within printhead 104 to fluidly couple with a row of jetting channels 300. Because the flow of print fluid through printhead 104 may be reversed, supply manifold 418 may act as a return manifold, and return manifold 422 may act as a supply manifold depending on the direction of flow of print fluid through printhead 104.

Printhead 104 also includes one or more bypass manifolds 610 disposed between supply manifold 418 and return manifold 422. Bypass manifold 610 is a groove, duct, conduit, etc., within head member 202 that fluidly couples two other manifolds directly. Thus, supply manifold 418 and return manifold 422 are fluidly coupled by jetting channels 300 (because they are a flow-through type), and are also fluidly coupled by bypass manifolds 610. A bypass manifold 610 is a high-impedance passage, which means that the fluid resistance of bypass manifold 610 is greater than the fluid resistance of jetting channels 300 within printhead 104. The length or width of bypass manifold 610 may be designed in a desired manner to ensure that the fluid resistance of bypass manifold 610 is greater than the fluid resistance of jetting channels 300. Bypass manifold 610 helps reduce the pressure delta required for printhead 300, and also helps reduce the pressure difference between nozzles 314 closer to I/O port 211 (which acts as an inlet) and nozzles 314 closer to I/O port 212 (which acts as an outlet).

Figure 7:
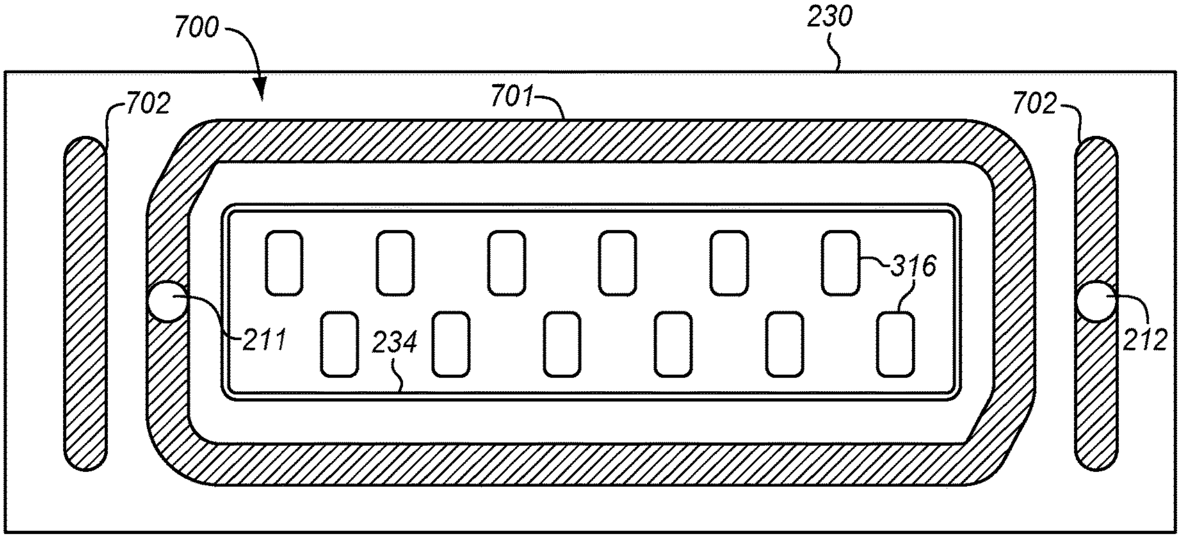
FIG. 7 is a bottom view of a housing in an illustrative embodiment.

The following embodiments set forth examples of the structure of head member 202. FIGS. 7-13 illustrate the structure of head member 202 in one illustrative embodiment. The structural elements in these figures are not drawn to scale, and are provided as an example. As an overview, head member 202 includes jetting channels for two rows of nozzles. Head member 202 also includes a supply manifold, a return manifold, and one or more bypass manifolds disposed between the supply manifold and the return manifold. As described above in FIG. 2, head member 202 includes a housing 230 and a plate stack 232. FIG. 7 is a bottom view of housing 230 in an illustrative embodiment. The bottom surface of housing 230 is referred to as interface surface 700, which is the surface of housing 230 that faces plate stack 232 and interfaces with plate stack 232. Housing 230 includes access hole 234 at or near its center that extends from interface surface 700 through to top surface 222 (see FIG. 2). Access hole 234 provides a passageway for actuators 316, such as a plurality of piezoelectric actuators, to pass through and interface with a diaphragm plate (shown in FIG. 8). In this embodiment, actuators 316 are arranged in two rows that are staggered.

Housing 230 also includes supply manifold duct 701, which comprises a cut or groove along interface surface 700 configured to convey a print fluid. Supply manifold duct 701 is generally a loop around access hole 234 that forms the supply manifold for printhead 104. Supply manifold duct 701 includes straight sections that are disposed longitudinally along the length of housing 230, and also include sections that are disposed transversely. Housing 230 further includes return manifold ducts 702, which also comprise cuts or grooves along interface surface 700 configured to convey a print fluid. Return manifold ducts 702 are disposed generally transverse on interface surface 700 toward the short ends of housing 230 to form the return manifold for printhead 104. Supply manifold duct 701 is fluidly coupled to I/O port 211, and one of return manifold ducts 702 is fluidly coupled to I/O port 212.

Figure 8:
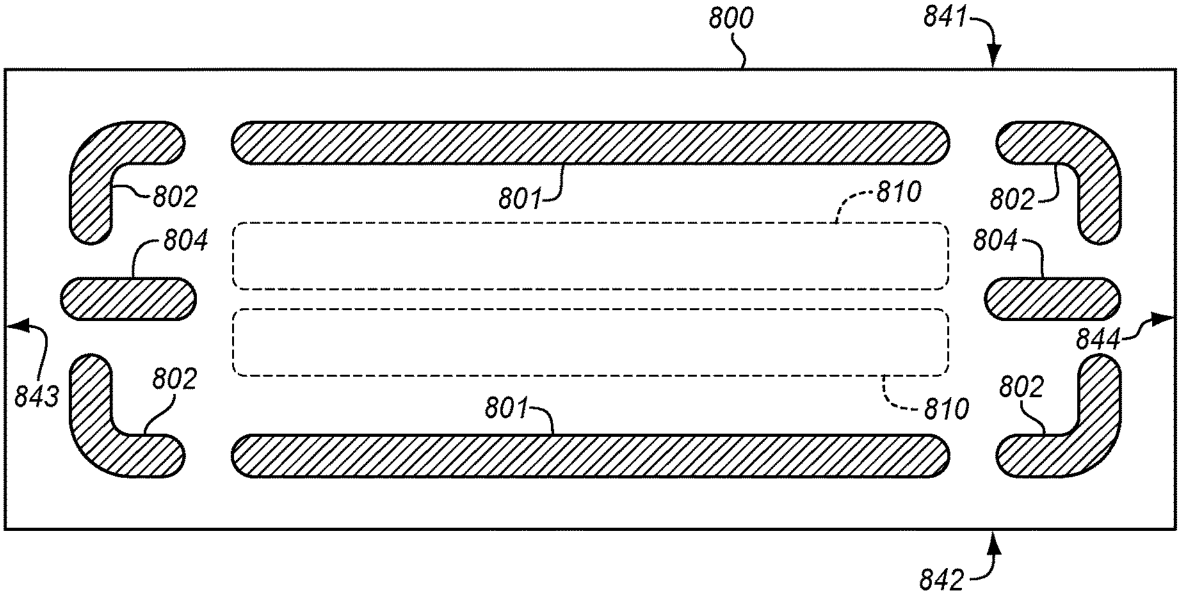
FIG. 8 is a plan view of a diaphragm plate in an illustrative embodiment.

FIGS. 8-13 show one example of plate stack 232 that includes a diaphragm plate, an upper restrictor plate, chamber plates, a lower restrictor plate, and a nozzle plate. FIG. 8 is a plan view of a diaphragm plate 800 in an illustrative embodiment. Diaphragm plate 800 is a thin sheet of material (e.g., metal, plastic, etc.) that is generally rectangular in shape and is substantially flat or planar. Diaphragm plate 800 includes diaphragm sections 810 comprising a semi-flexible material that forms diaphragms for the jetting channels. Diaphragm plate 800 further includes supply manifold openings 801, which comprise elongated apertures or holes through diaphragm plate 800 disposed longitudinally along a length of diaphragm plate 800. Supply manifold openings 801 are disposed toward the long sides 841-842 of diaphragm plate 800 on opposing sides of diaphragm sections 810 to coincide with the longitudinal sections of supply manifold duct 701 of housing 230 and to form the supply manifold. In other embodiments, supply manifold openings 801 may include or comprise filters.

Diaphragm plate 800 also includes return manifold openings 802 that coincide, at least in part, with return manifold ducts 702 of housing 230. Return manifold openings 802 comprise apertures or holes through diaphragm plate 800 disposed toward the corners of diaphragm plate 800, where the long sides 841-842 of diaphragm plate 800 meet the short sides 843-844. Diaphragm plate 800 also includes bypass manifold openings 804. Bypass manifold openings 804 comprise elongated apertures or holes through diaphragm plate 800 that coincide with supply manifold duct 701 and a return manifold duct 702 of housing 230, and are configured to fluidly couple supply manifold duct 701 with return manifold duct 702. Bypass manifold openings 804 may be disposed longitudinally as shown in FIG. 8, but may have different orientations to intersect with both the supply manifold duct 701 and a return manifold duct 702. Although the position of bypass manifold openings 804 may vary as desired, bypass manifold openings 804 may be positioned toward the short ends 843-844 of diaphragm plate 800, and extend inward toward diaphragm sections 810.

Figure 9:
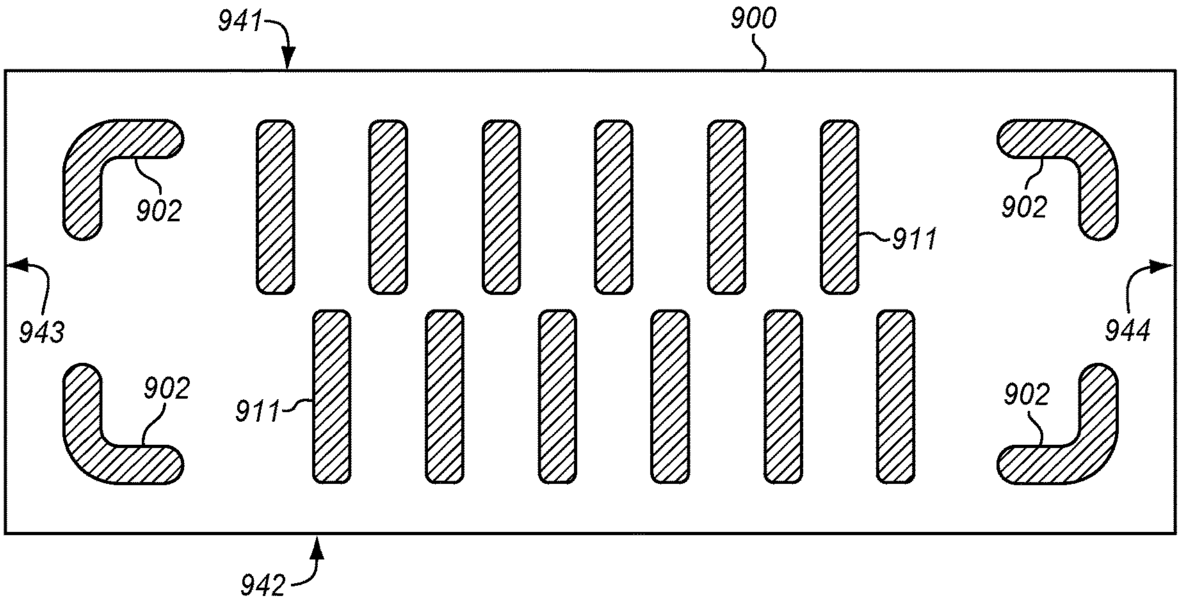
FIG. 9 is a plan view of an upper restrictor plate in an illustrative embodiment.

FIG. 9 is a plan view of upper restrictor plate 900 in an illustrative embodiment. Upper restrictor plate 900 is a thin sheet of material that is generally rectangular in shape and is substantially flat or planar. Upper restrictor plate 900 includes restrictor openings 911, which comprise elongated apertures or holes through upper restrictor plate 900 transversely disposed or oriented between a center of upper restrictor plate 900 and a long side 941-942 of upper restrictor plate 900. Restrictor openings 911 are configured to fluidly couple pressure chambers of jetting channels with supply manifold openings 801 of diaphragm plate 800. Restrictor openings 911 are aligned in two longitudinal rows that are staggered in this embodiment, but the configuration of the restrictors may vary as desired. Upper restrictor plate 900 also includes return manifold openings 902 that coincide, at least in part, with return manifold openings 802 of diaphragm plate 800. Return manifold openings 902 comprise apertures or holes through upper restrictor plate 900 disposed toward the corners of upper restrictor plate 900, where the long sides 941-942 of upper restrictor plate 900 meet the short sides 943-944.

Figure 10:
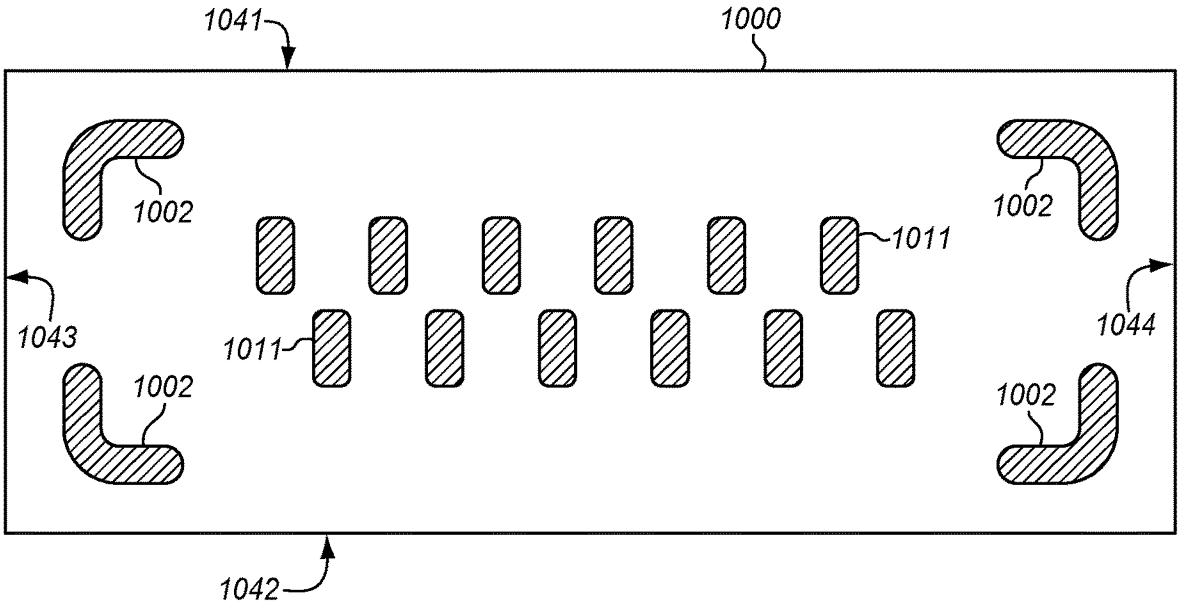
FIG. 10 is a plan view of an upper chamber plate in an illustrative embodiment.

FIG. 10 is a plan view of an upper chamber plate 1000 in an illustrative embodiment. Upper chamber plate 1000 is a thin sheet of material that is generally rectangular in shape and is substantially flat or planar. Upper chamber plate 1000 includes chamber openings 1011 disposed toward a middle region of upper chamber plate 1000. Chamber openings 1011 comprise apertures or holes through upper chamber plate 1000 transversely disposed or oriented between a center of upper chamber plate 1000 and a long side 1041-1042 of upper chamber plate 1000. Chamber openings 1011 form pressure chambers for the jetting channels. Chamber openings 1011 do not extend transversely as far as restrictor openings 911 (see FIG. 9). Chamber openings 1011 are aligned in two longitudinal rows that are staggered in this embodiment, but the configuration of the chambers may vary as desired. Upper chamber plate 1000 also includes return manifold openings 1002 that coincide, at least in part, with return manifold openings 902 of upper restrictor plate 900. Return manifold openings 1002 comprise apertures or holes through upper chamber plate 1000 disposed toward the corners of upper chamber plate 1000, where the long sides 1041-1042 of upper chamber plate 1000 meet the short sides 1043-1044.

Figure 11:
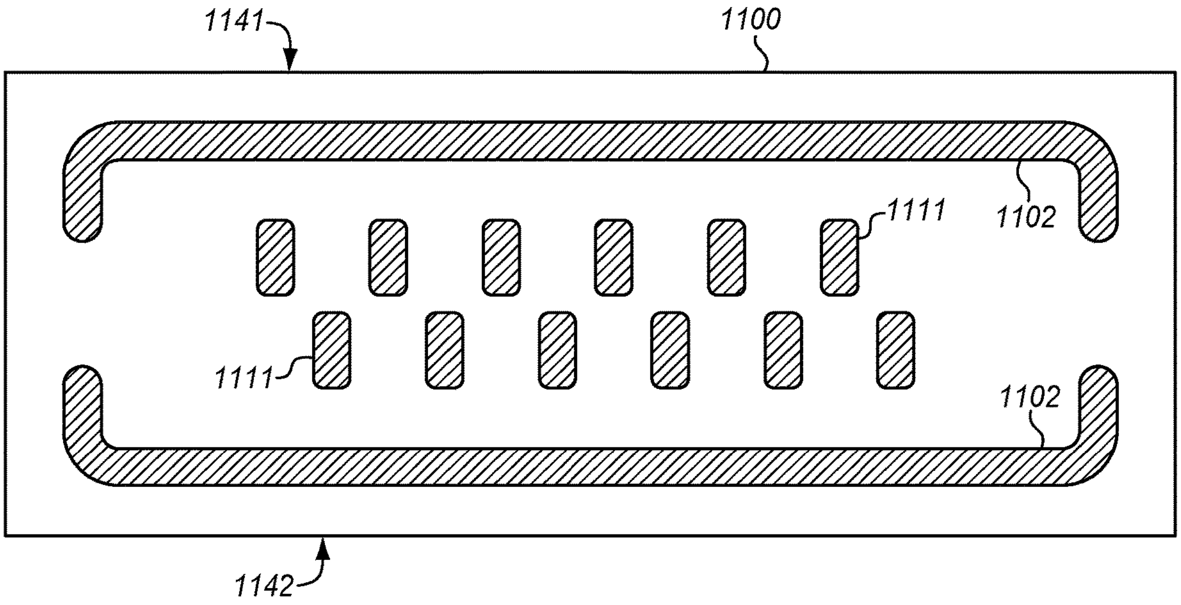
FIG. 11 is a plan view of a lower chamber plate in an illustrative embodiment.

FIG. 11 is a plan view of a lower chamber plate 1100 in an illustrative embodiment. Lower chamber plate 1100 is a thin sheet of material that is generally rectangular in shape and is substantially flat or planar. Lower chamber plate 1100 includes chamber openings 1111 disposed toward a middle region of lower chamber plate 1100. Chamber openings 1111 comprise apertures or holes through lower chamber plate 1100 that are transversely disposed or oriented between a center of lower chamber plate 1100 and a long side 1141-1142 of lower chamber plate 1100. Chamber openings 1111 coincide with chamber openings 1011 of upper chamber plate 1000 to form the pressure chambers for the jetting channels. Chamber openings 1111 are aligned in two longitudinal rows that are staggered in this embodiment, but the configuration of the chambers may vary as desired. Lower chamber plate 1100 further includes return manifold openings 1102, which comprise elongated apertures or holes through lower chamber plate 1100 disposed longitudinally along a length of lower chamber plate 1100. Return manifold openings 1102 are disposed toward the long sides 1141-1142 of lower chamber plate 1100 on opposing sides of chamber openings 1111 to coincide with return manifold openings 1002 of upper chamber plate 1000, and form the return manifold.

Figure 12:
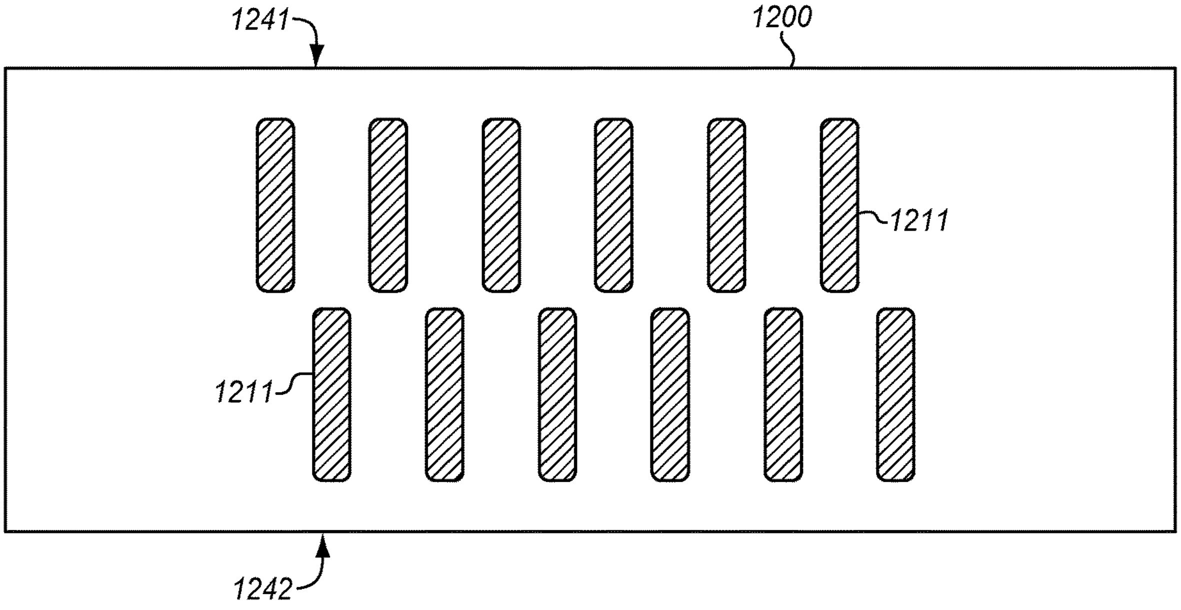
FIG. 12 is a plan view of a lower restrictor plate in an illustrative embodiment.

FIG. 12 is a plan view of lower restrictor plate 1200 in an illustrative embodiment. Lower restrictor plate 1200 is a thin sheet of material that is generally rectangular in shape and is substantially flat or planar. Lower restrictor plate 1200 includes restrictor openings 1211, which comprise elongated apertures or holes through lower restrictor plate 1200 transversely disposed or oriented between a center of lower restrictor plate 1200 and a long side 1241-1242 of lower restrictor plate 1200. Restrictor openings 1211 are configured to fluidly couple pressure chambers of jetting channels with return manifold openings 1102 of lower chamber plate 1100. Restrictor openings 1211 are aligned in two longitudinal rows that are staggered in this embodiment, but the configuration of the restrictors may vary as desired.

Figure 13:
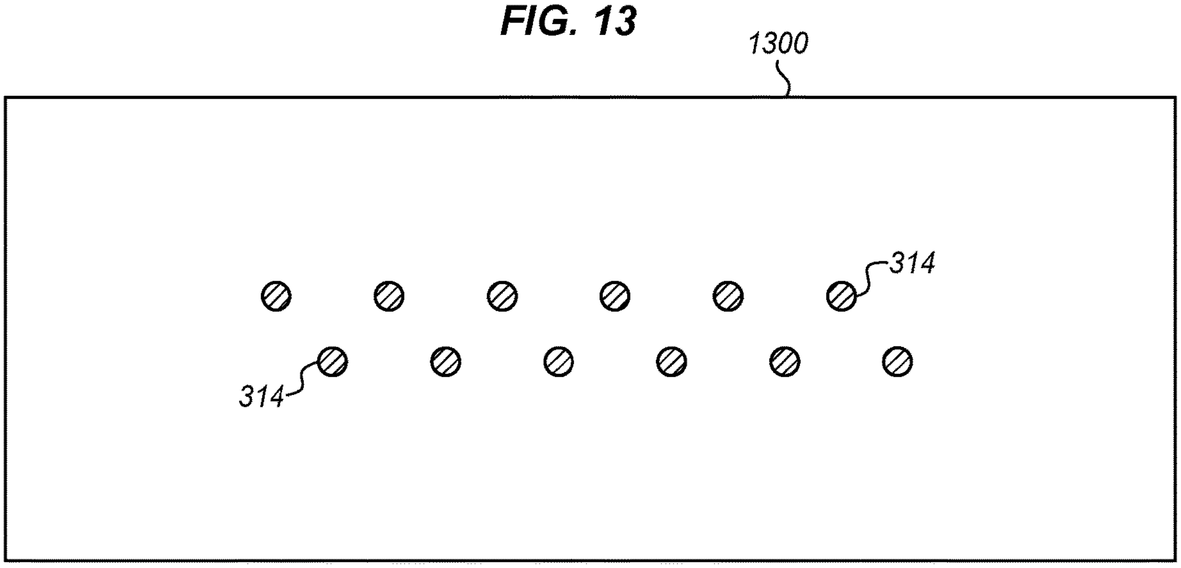
FIG. 13 is a plan view of a nozzle plate in an illustrative embodiment.

FIG. 13 is a plan view of nozzle plate 1300 in an illustrative embodiment. Nozzle plate 1300 is a thin sheet of material that is generally rectangular in shape and is substantially flat or planar. Nozzle plate 1300 includes orifices that form nozzles 314 of the jetting channels. Nozzles 314 are arranged in two nozzle rows that are staggered or offset from one another, but may be arranged in a single row, two rows, in four rows, or another number of rows in other embodiments.

Figure 14:
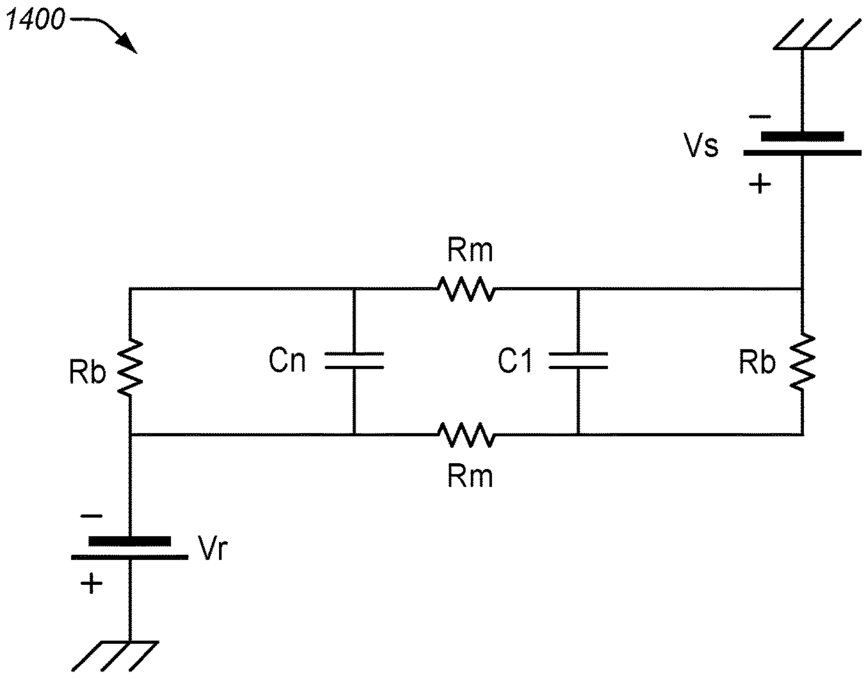
FIG. 14 is an electrical circuit model of a printhead in an illustrative embodiment.
Figure 15:
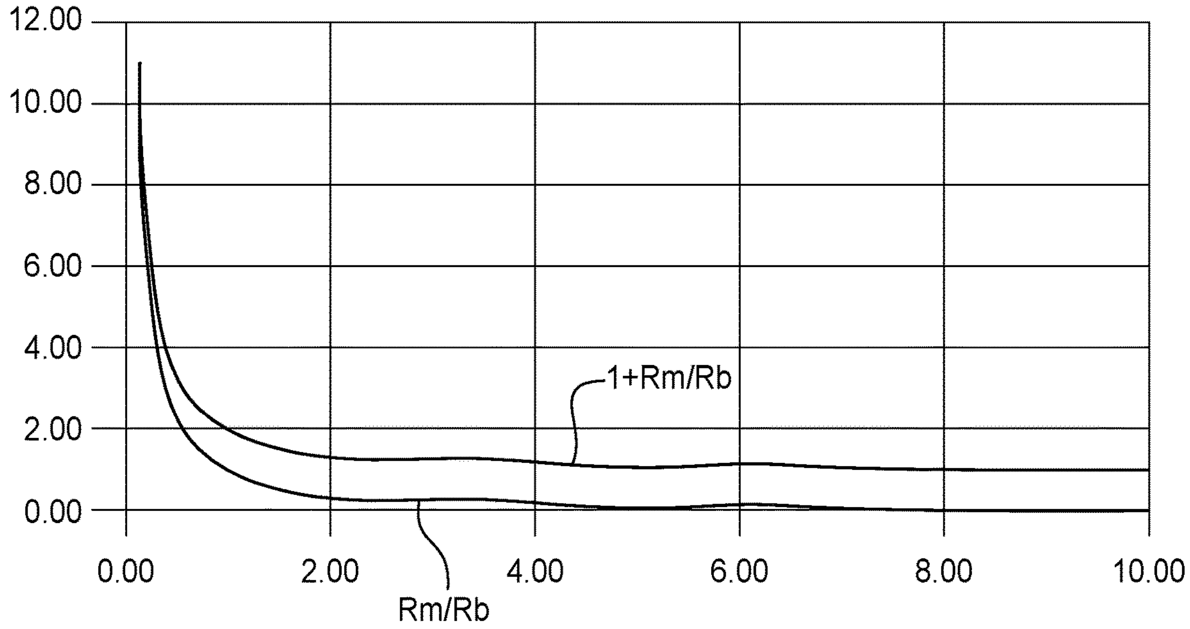
FIG. 15 is a graph showing resistance ratios in an illustrative embodiment.

The flow resistance of bypass manifold 610 (see FIG. 6) may be tuned or selected for optimal performance of printhead 104. The following provides an example of selecting a flow resistance for bypass manifold 610. Printhead 104 may be modeled as an electrical circuit 1400 as shown in FIG. 14. In electrical circuit 1400, Vs represents supply inlet pressure, Vr represents return outlet pressure, Vm represents a pressure delta across a manifold, Vc represents a pressure delta across a pressure chamber, Rm represents a manifold resistance, Rb represents a bypass resistance, C1 represents a first pressure chamber, and Cn represents a last pressure chamber. To solve for Rb, total V=Vs+Vr, total R=(Rm+Rb)/2, and total I=V/R=2V/(Rm+Rb). Vc=Vc1=Vcn=Rb*I/2=Rb*V/(Rm+Rb). Total pressure between inlet and outlet V, normalized by Vc, is V/Vc=(Rm+Rb)/Rb=1+Rm/Rb. Pressure across a manifold (i.e., the delta between C1 and Cn), normalized by Vc, is Rm*I/2/Vc=Rm*[2V/(Rm+Rb)]/2/[Rb*V/(Rm+Rb)]=Rm/Rb. Vc and Rm are constants, so Rb may be selected based on delta pressure between inlet and outlet (1+Rm/Rb) and/or delta pressure across a manifold (Rm/Rb). FIG. 15 is a graph showing resistance ratios in an illustrative embodiment.

Although specific embodiments were described herein, the scope of the invention is not limited to those specific embodiments. The scope of the invention is defined by the following claims and any equivalents thereof.

What is claimed is:

1. A printhead comprising:

a plurality of jetting channels configured to jet a print fluid, wherein each of the jetting channels includes a pressure chamber, a nozzle, and a diaphragm;

a first manifold disposed within the printhead that is fluidly coupled to the jetting channels, wherein the first manifold includes longitudinal sections disposed longitudinally along a length of the printhead and fluidly coupled to the jetting channels via first fluid paths, and includes transverse sections disposed transversely along a width of the printhead;

a second manifold disposed within the printhead that is fluidly coupled to the jetting channels, wherein the second manifold includes longitudinal sections disposed longitudinally and fluidly coupled to the jetting channels via second fluid paths, and includes transverse sections disposed transversely; and at least one bypass manifold fluidly coupled between a transverse section of the first manifold and a transverse section of the second manifold.

2. The printhead of claim 1 wherein:

the at least one bypass manifold reduces a pressure delta required for the printhead.

3. The printhead of claim 1 wherein:
the first manifold comprises a loop within the printhead that includes the longitudinal sections and the transverse sections of the first manifold.

4. The printhead of claim 1 wherein:
the at least one bypass manifold is disposed longitudinally between the transverse section of the first manifold and the transverse section of the second manifold.

5. The printhead of claim 1 wherein:
the first manifold is directly coupled to pressure chambers of the jetting channels through first restrictors; and
the second manifold is directly coupled to the pressure chambers of the jetting channels through second restrictors.

6. The printhead of claim 5 wherein:
the first manifold is disposed between a first Input/Output (I/O) port of the printhead, and the first restrictors; and
the second manifold is disposed between a second I/O port of the printhead, and the second restrictors.

7. The printhead of claim 1 further comprising:
a single, first Input/Output (I/O) port fluidly coupled to the first manifold; and
a single, second I/O port fluidly coupled to the second manifold.

8. The printhead of claim 7 wherein:
a fluid resistance of the at least one bypass manifold is tuned to reduce a pressure difference between nozzles closer to the single, first I/O port and the nozzles closer to the single, second I/O port.

9. The printhead of claim 1 wherein:
at least one of a length and a width of the at least one bypass manifold is tuned with a fluid resistance greater than a fluid resistance of the jetting channels.

10. The printhead of claim 1 wherein:
the jetting channels are formed with a plate stack; and
a diaphragm plate of the plate stack includes diaphragms of the jetting channels and the at least one bypass manifold.

11. A jetting apparatus comprising:
the printhead of claim 1; and
a controller configured to control the printhead to jet the print fluid.

12. A printhead comprising:
a plurality of jetting channels configured to jet a print fluid that are arranged in one or more rows along a length of the printhead, wherein each of the jetting channels includes a pressure chamber, a nozzle, and a diaphragm;
a first manifold within the printhead disposed between a first Input/Output (I/O) port and the jetting channels, wherein major sections of the first manifold are disposed longitudinally within the printhead, and the first manifold includes transverse sections disposed transversely along a width of the printhead;
a second manifold within the printhead disposed between a second I/O port and the jetting channels, wherein major sections of the second manifold are disposed longitudinally within the printhead, and the second manifold includes transverse sections disposed transversely; and
at least one bypass manifold fluidly coupled between a transverse section of the first manifold and a transverse section of the second manifold.

13. The printhead of claim 12 wherein:
the at least one bypass manifold is disposed longitudinally within the printhead between the transverse section of the first manifold and the transverse section of the second manifold.

14. The printhead of claim 12 wherein:
the first manifold comprises a loop within the printhead that includes the major sections and the transverse sections of the first manifold.

15. The printhead of claim 12 wherein:
a fluid resistance of the at least one bypass manifold is tuned to reduce a pressure difference between nozzles closer to the first I/O port and the nozzles closer to the second I/O port.

16. The printhead of claim 12 wherein:
at least one of a length and a width of the at least one bypass manifold is tuned with a fluid resistance greater than a fluid resistance of the jetting channels.

17. The printhead of claim 12 wherein:
the jetting channels are formed with a plate stack; and
a diaphragm plate of the plate stack includes diaphragms of the jetting channels and the at least one bypass manifold.

18. A jetting apparatus comprising:
the printhead of claim 12; and
a controller configured to control the printhead to jet the print fluid.

19. A jetting apparatus comprising:
at least one printhead configured to jet droplets onto a medium; and
a controller configured to control the at least one printhead;
wherein the at least one printhead includes:
- a plurality of jetting channels arranged in one or more rows along a length of the at least one printhead, wherein each of the jetting channels includes a pressure chamber, a nozzle, and a diaphragm;
- a first manifold within the at least one printhead disposed between a first Input/Output (I/O) port and the jetting channels, wherein major sections of the first manifold are disposed longitudinally within the at least one printhead, and the first manifold includes transverse sections disposed transversely along a width of the at least one printhead;
- a second manifold within the at least one printhead disposed between a second I/O port and the jetting channels, wherein major sections of the second manifold are disposed longitudinally within the at least one printhead, and the second manifold includes transverse sections disposed transversely; and
- at least one bypass manifold fluidly coupled between a transverse section of the first manifold and a transverse section of the second manifold.

20. The jetting apparatus of claim 19 wherein:
the jetting apparatus comprises an inkjet printer.

* * * * *